No. 657,220. Patented Sept. 4, 1900.
E. JENKINS.
SELF OPERATING WAGON BRAKE.
(Application filed Mar. 20, 1900.)
(No Model.)
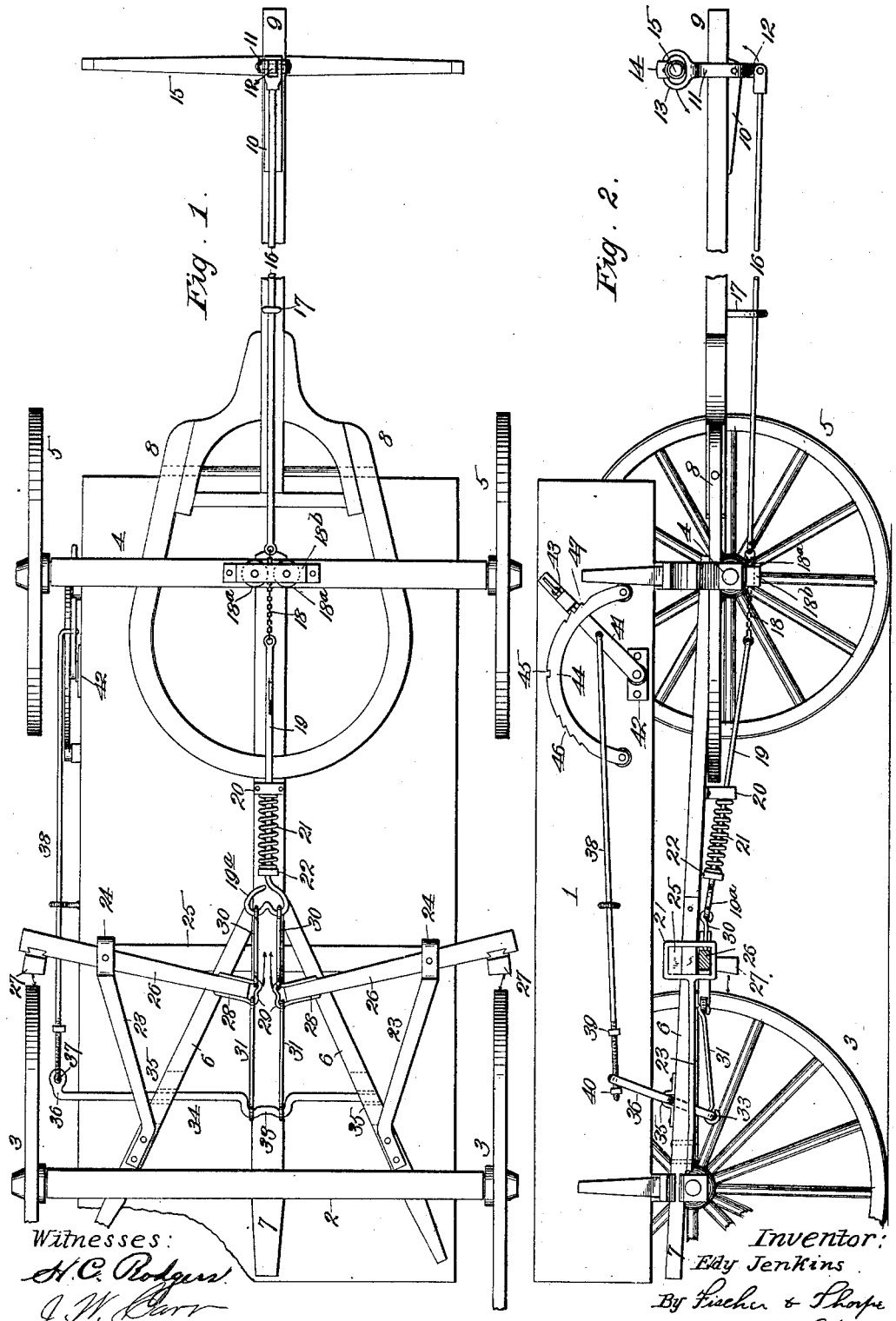
Witnesses:
H. C. Rodgers
J. W. Carr
Inventor:
Edy Jenkins
By Fischer & Thorpe
Attys.

UNITED STATES PATENT OFFICE.

EDY JENKINS, OF CULLISON, KANSAS.

SELF-OPERATING WAGON-BRAKE.

SPECIFICATION forming part of Letters Patent No. 657,220, dated September 4, 1900.

Application filed March 20, 1900. Serial No. 9,354. (No model.)

*To all whom it may concern:*

Be it known that I, EDY JENKINS, of Cullison, Pratt county, Kansas, have invented a new and useful Self-Operating Wagon-Brake, of which the following is a specification.

My invention relates to that class of self-operating wagon-brakes which can be easily and quickly applied to a wagon and embody features of construction whereby as the neck-yoke bar is pulled rearward by the backing of the draft-animals the brake will be automatically applied; and my object is to produce a brake mechanism of this character possessing the desirable features of simplicity, strength, durability, and cheapness of construction.

To this end and others the invention consists in certain novel and peculiar features of construction and combinations of parts, as will be hereinafter described and claimed, and in order that the invention may be fully understood reference is to be had to the accompanying drawings, in which—

Figure 1 represents an inverted plan view of a wagon provided with a self-operating wagon-brake embodying my invention. Fig. 2 is a side elevation of the same, the near wheels being omitted and one of the brake-beams being shown in section.

Referring now to the drawings in detail, where like reference-numerals designate corresponding parts, 1 designates the body of the wagon; 2, the rear axle; 3, the rear wheels; 4, the front axle; 5, the front wheels; 6, the rear hounds; 7, the reach or coupling pole extending from the front to the rear axles; 8, the front hounds, and 9 the tongue.

10 designates a reinforce-bar secured to the under side of the tongue near its front end, and 11 a lever provided with an opening through which the tongue and bar 10 project, the lever being pivoted to said bar and adapted to swing, as indicated by the arrow, Fig. 2. The lower end of the lever is provided with a depending lug 12, and its upper end terminates in an elongated loop 13, to which is loosely clipped, as at 14, the neck-yoke bar 15, extending transversely in and adapted to swing to a limited extent in the elongated opening 13.

16 designates a pull-rod pivoted to the lug 12 and terminating at its rear end just in front of the front axle, being guided and supported in the depending arm 17. The rear end of pull-rod 16 is connected to a chain or other flexible connection 18, extending between a pair of guide-pulleys 18$^a$, secured to the under side of the axle upon bracket 18$^b$, and the rear end of the chain is connected to the pull-rod 19, extending reciprocally through a guide-bracket 20, depending from the coupling-pole, and terminating at its rear end in a double or heart-shaped loop 19$^a$. This pull-rod normally occupies the position shown and is held thereat with a yielding pressure by the spring 21, spirally encircling the rod and bearing at its opposite ends against bracket 20 and collar 22, secured upon the rod.

23 designates a pair of brackets secured to the rear hounds and diverging forwardly therefrom and terminating at their front ends in vertical loops 24, through which extends the brace and supporting bar 25, secured upon the upper side of the reach or coupling pole 7 in any suitable manner.

26 designates the brake beams or levers, arranged horizontally below the coupling-pole and rear hounds and extending through and pivoted to said loops and carrying at their outer ends suitable brake-shoes 27. Secured to the inner ends of the brake beams or levers are brackets 28, formed with double loops 29, the foremost of which are connected by links 30 with double loop 19$^a$ of spring-retracted pull-rod 19. The rear loops 29 are connected by longitudinal pull-rods 31 with the crank 33 of transverse shaft 34, journaled upon the rear hounds 7 in brackets 35, one end of said shaft projecting beyond the corresponding side of the wagon-bed and terminating in the upwardly-projecting crank-arm 36, formed with an elongated opening 37, through which slidingly extends the pull-and-push rod 38, said rod carrying taps 39 40 at opposite sides of the crank-arm, the former by pressure against the crank-arm being adapted to apply the brakes and the latter by pressure against the opposite side of the crank-arm being adapted to effect the release of the brakes, as shown in Fig. 2. The front end of rod 38 is connected pivotally to hand-lever 41, mounted upon bracket 42, secured to the wagon-body, and provided with a customary spring-actuated dog 43 for engagement with sector 44, secured to the side of the body concentrically of the axis of said lever. The sector is provided centrally with the straight peripheral notch 45, which when engaged by the dog 43 holds the rod 38 in such position that the brake is free to operate. The sector is also provided rearward of notch 45 with the rearwardly-disposed bevel-teeth 46, with which the dog is engaged when it is desired to lock the brake against the wheels—for instance, when it is desired to rest the animals while ascending a grade. The sector is provided forward of notch 45 with the forwardly-disposed bevel-teeth 47, with which the dog 43 is engaged when it is desired to lock the brake in its inoperative position, it being necessary to so secure the brake when it is desired to back the wagon, as will be readily understood.

In practice it is necessary to accommodate the turning of the wagon toward one side or the other, which object I effect by the provision of the flexible connection 18 between pull-rods 16 19, said flexible connection or chain being adapted to turn on one roller 18$^a$ or the other, according to the direction the wagon turns, the connection being also of suitable length to always coincide with the king or pivot bolt (not shown) of the wagon, irrespective of the position of the pull-rods.

From the above description it will be apparent that I have produced a self-operating wagon-brake embodying the features of advantage enumerated as desirable in the statement of invention, and it is to be understood that certain changes in the detail construction, form, proportion, or arrangement of the parts may be made without departing from the spirit and scope or sacrificing any of the advantages of the appended claims.

Having thus described the invention, what I claim as new, and desire to secure by Letters Patent, is—

1. A device of the character described, comprising a bar extending transversely of and upon the reach and rear hounds of the wagon, a pair of brackets secured to said hounds and provided with loops at their front ends secured to and embracing the ends of said bar, a pair of brake-beams extending through and pivoted in the loops of said brackets, and provided with shoes at their outer ends, a lever mounted on the tongue and carrying the neck-yoke bar, a pull-rod connected to said lever, a pull-rod 19 connected to the first-named pull-rod, links connecting the inner ends of the brake-beams with said pull-rod 19, a spring engaging pull-rod 19 and holding the brake-shoes away from the wheels, and means for locking the brake-shoes away from the wheels, substantially as described.

2. A device of the character described, comprising a bar extending transversely of and upon the reach and rear hounds of the wagon, a pair of brackets secured to said hounds and provided with loops at their front ends secured to and embracing the ends of said bar, a pair of brake-beams extending through and pivoted in the loops of said brackets, and provided with shoes at their outer ends, a lever mounted on the tongue and carrying the neck-yoke bar, a pull-rod connected to said lever, a pull-rod 19 connected to the first-named pull-rod, links connecting the inner ends of the brake-beams with said pull-rod 19, a spring engaging pull-rod 19 and holding the brake-shoes away from the wheels, a crank-shaft linked to the brake-beams, a lever pivoted to the wagon and connected to the crank-shaft, and means for locking said lever with the brakes released or applied, substantially as described.

3. A device of the character described, comprising a cross-bar secured to the reach and rear hounds of the wagon, brackets secured to said hounds and provided with loops embracing the ends of said bar, brake-beams extending through the pivoted end of said brackets and provided with brake-shoes, a pull-rod linked to the brake-beams, a spring normally holding the said pull-rod at its rearmost limit of movement, a pull-rod slidably carried by the tongue, a flexible connection between said pull-rods, guide-pulleys for said flexible connection, a lever pivoted to and fitting over the tongue and connected to the front end of the last-named pull-rod, and provided at its upper end with an elongated loop 13, and the neck-yoke bar extending through said loops and loosely suspended from the lever, substantially as described.

In testimony whereof I affix my signature in the presence of two witnesses.

EDY JENKINS.

Witnesses:
H. C. RODGERS,
F. G. FISCHER.